United States Patent
Bertran et al.

(10) Patent No.: US 11,088,925 B2
(45) Date of Patent: Aug. 10, 2021

(54) TECHNOLOGIES FOR CAPACITY REMEDIATION IN MULTI-TENANT CLOUD ENVIRONMENTS

(71) Applicant: salesforce.com, inc., San Francisco, CA (US)

(72) Inventors: Ana Bertran, San Francisco, CA (US); Carl Morgenstern, San Francisco, CA (US); Daisuke Kawamoto, San Francisco, CA (US); Nicholas Roan, San Francisco, CA (US); Steve Bobrowski, San Francisco, CA (US); Sudhish Iyer, San Francisco, CA (US); Chin Lee, San Francisco, CA (US); Kunal Vashi, San Francisco, CA (US); Zahid Rahman, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 383 days.

(21) Appl. No.: 15/876,548

(22) Filed: Jan. 22, 2018

(65) Prior Publication Data
US 2019/0173765 A1    Jun. 6, 2019

Related U.S. Application Data

(60) Provisional application No. 62/594,400, filed on Dec. 4, 2017.

(51) Int. Cl.
*G06F 16/20* (2019.01)
*H04L 12/24* (2006.01)
*G06F 16/25* (2019.01)
*G06F 16/28* (2019.01)

(52) U.S. Cl.
CPC ........ *H04L 41/5025* (2013.01); *G06F 16/254* (2019.01); *G06F 16/283* (2019.01); *H04L 41/147* (2013.01); *H04L 41/5009* (2013.01); *H04L 41/5032* (2013.01); *H04L 41/16* (2013.01); *H04L 41/5096* (2013.01)

(58) Field of Classification Search
USPC .................................................. 707/600
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |

(Continued)

*Primary Examiner* — Jau Shya Meng
(74) *Attorney, Agent, or Firm* — Schwabe Williamson & Wyatt

(57) ABSTRACT

Multitier, multitenant architecture of pods comprise multiple stacks with different metrics and workload compositions that constantly change over time. A computer system may identify an overall pod time-to-live (TTL) based on the changing metrics and workloads. The TTL may be a forecasted time that pod remediation is needed to avoid negative impact on pod performance and customer experience. Additionally, the computer system may identify the appropriate remediation(s) for each pod. The computer system may compare and prioritize remediations across a collection of pods with different configurations and workload characteristics based on the TTLs. Other embodiments may be described and/or claimed.

20 Claims, 7 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,128,825 B1* | 9/2015 | Albrecht ............ G06F 12/0246 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | | |
|---|---|---|---|
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshavsky | |
| 2011/0247051 A1 | 10/2011 | Bulumulla | |
| 2011/0271005 A1* | 11/2011 | Bharrat | H04L 65/1063 709/232 |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0073809 A1* | 3/2013 | Antani | G06F 12/121 711/136 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2017/0155665 A1* | 6/2017 | Dufour | G06F 21/566 |
| 2019/0068622 A1* | 2/2019 | Lin | G06F 9/45558 |
| 2019/0349426 A1* | 11/2019 | Smith | H04W 4/08 |
| 2020/0133760 A1 | 4/2020 | Volkov et al. | |
| 2020/0242532 A1 | 7/2020 | Kawamoto et al. | |

* cited by examiner

TECHNOLOGIES FOR CAPACITY REMEDIATION IN MULTI-TENANT CLOUD ENVIRONMENTS

RELATED APPLICATIONS

The present application claims priority under 35 U.S.C. § 119 to U.S. Provisional Application No. 62/594,400 filed on Dec. 4, 2017, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to systems and methods for identifying and applying capacity remediations in multi-tiered, multi-tenant cloud computing environments.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. Users of a multi-tenant database system (e.g., a tenant/organization (org) or developers associated with the tenant) may develop applications or platforms that interact or integrate with the multi-tenant database system and utilize data from an associated tenant space. The applications/platforms may be used by users (e.g., associates of an org) to obtain data from the associated tenant space to render/display visual representations of relevant tenant data. The applications/platforms may include program code or script(s) that call an application programming interface (API) to obtain data and/or generate visual representations of data. The multi-tenant database systems may include various servers to service requests and provide data to the user/tenants. Overtime and due to heavy usage, these servers may need remediation. However, it is often difficult to identify the servers that need remediation, and the types of remediations that servers may need.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 5A and 5B show various example user interfaces in accordance with various example embodiments.

DETAILED DESCRIPTION

Figure 1A:
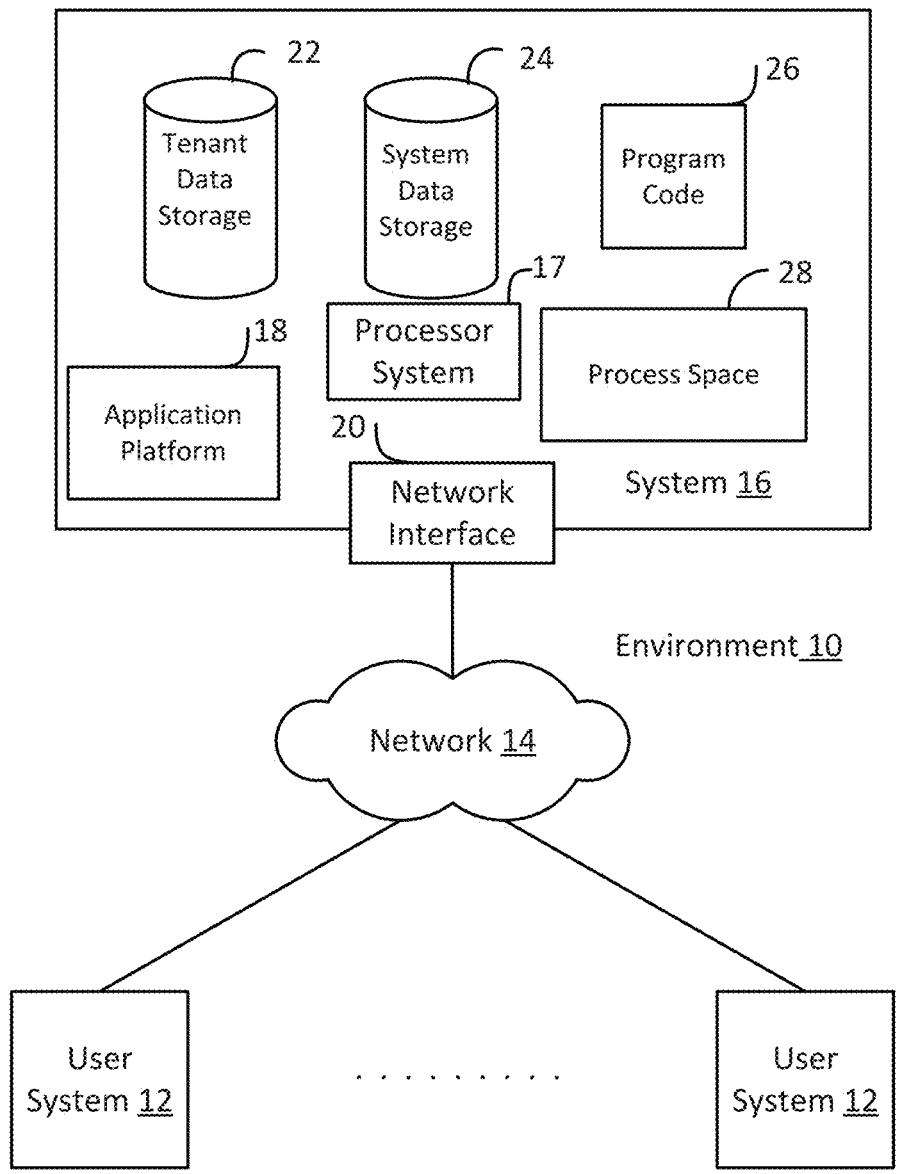
FIG. 1A shows a block diagram of an example environment in which an on-demand database service can be used according to some implementations.

Embodiments discussed herein provide mechanisms for identifying servers for remediation, as well as identifying and applying remediations to servers. In embodiments, a multi-tier, multi-tenant database and/or cloud computing system may include various pods, where each pod comprises hardware and software that support a discrete subset of customer/tenant organizations (orgs). Each pod in an environment (e.g., a data center) may comprise one or more servers or other computing resources, and each pod may implement several hosts or stacks. Each of these stacks/hosts may have different configurations and workload characteristics/metrics that change over time, and could negatively impact tenant/customer experience.

In disclosed embodiments, a time-to-live (TTL) before pod remediation is to occur may be identified, an appropriate remediation that should be done for each pod may be identified, and when the identified remediations should take place may also be identified prior to applying the remediations. Pod remediation may be prioritized based on which pods need remediation sooner as compared with remediation needs of other pods in the environment. Additionally, TTL forecasting may be based on a comparison of measured metrics with various service level agreement (SLA) metrics, which may be a better indicator of user/customer experience when compared to using mechanical capacity as a basis for remediation as is the case in many conventional systems. Furthermore, the forecasting mechanisms are also based on continuously changing workload characteristics rather than using a static or straightforward TTL countdown as are used in conventional systems.

In embodiments, a computer system may Determine best drivers for each of the sub components. The impact on customer performance on the different tiers manifests differently in the different metrics; for example, for app cpu, as the pod gets stressed the variability of the upper quantiles constantly increases in a balanced manner across the hosts in the pod. For db cpu, the stress is a function of the increase in the median quantile and the increase in spread of the box plot fence range. Additionally, db cpu hosts in a pod are typically not well balanced. When coming up with a TTL for a pod, this imbalance needs to be accounted for.

Embodiments may include robust forecasting mechanisms to address data produced by each metric having different variability. Embodiments may include mechanisms to identify changes in hardware (capacity add), new pods, code regression, optimization, and workload to address forecasting due to significant changes in workload characteristics.

Embodiments may include mechanisms to determine best drivers based on three dimensional grid of technical stacks (i.e., the tiers), set of metrics, and correlation with performance SLA metrics. Embodiments may include mechanisms to identify drivers that dictate the impact on end-user performance experience based on different workload characteristics.

Embodiments may include robust forecasting, which accounts for metric variabilities and possible imbalances across host based on historical TTL and feedback to the model; quantile regression using several quantiles and forecasting quantile ranges; and/or best forecasting interval.

Embodiments may include detection of significant changes as compared to the inherent metric variation, in the slope of the metric quantile regression lines, together with other signals such as hardware changes, code release dates, are used to determine when to restart the model or when to mask certain parts of the metric from the forecast.

In embodiments, a computer system may generate a composition TTL, which combines multiple tiers and metrics to determine capacity remediations for a pod. The computer system may predict a TTL for each driver metric, combine all metric TTLs to obtain an overall TTL. The computer system may prioritize pods according to pods needing remediation sooner than other pods and whether the pod survive until an Instance Refresh date before remediation is required (e.g., whether the TTL is before or after the instance refresh date). Other embodiments may be described and/or claimed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

Some implementations may refer to the term "tenant," which may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Some implementations may refer to the term "instance," which may refer to a concrete occurrence of an object, which may occur, for example, during execution of program code. Terms "instantiate," "instantiation," and the like may refer to the creation of an instance. Some implementations may refer to the term "object," which may refer to an instance of a class, and may include one or more variables, data structures, functions, methods, database elements, etc. and may have a memory location and a value that are referenced by an identifier.

Some implementations may refer to the term "computing resource," "hardware resource," etc., which may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network. Some implementations may refer to the term "web resource" or the like, which may refer to any resource that is accessible or retrievable from a remote system or device. Examples of web resources may include any hardware/computing resources, network resources, software resources, and resources created or developed for web/distributed applications. As used herein, the term "web resource" may refer to both the resource itself and the address (e.g., uniform resource locator (URL)) used to access/retrieve the web resource.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include HTML, Extensible Markup Language (XML), Java Script Object Notion (JSON), Cascading Stylesheets (CSS), JavaServer Pages (JSP), MessagePack™, Apache® Thrift, Abstract Syntax Notation One (ASN.1), Google® Protocol Buffers (protobuf), database objects, or some other like object(s)/document(s). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (for example, a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system.

In an example, the user systems 12 may implement web, user, or third party applications to request and obtain data from database system 16, and render graphical user interfaces (GUIs) in an application container or browser. In some implementations, the GUIs may include a data analytics GUI, such as Salesforce® Wave™ dashboard, which may provide visual representations of data residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user id), password, personal identification number (PIN), digital certificates, etc.) to the database system 16 so that the database system 16 may authenticate the identity of a user of the user system 12.

The web, user, or third party application(s) discussed herein may be a software, program code, logic modules, application packages, etc. that are built using website development tools and/or programming languages, such as HTML, CSS, JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). Furthermore, such applications may utilize a suitable querying language to query (access), manipulate, and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

Figure 1B:
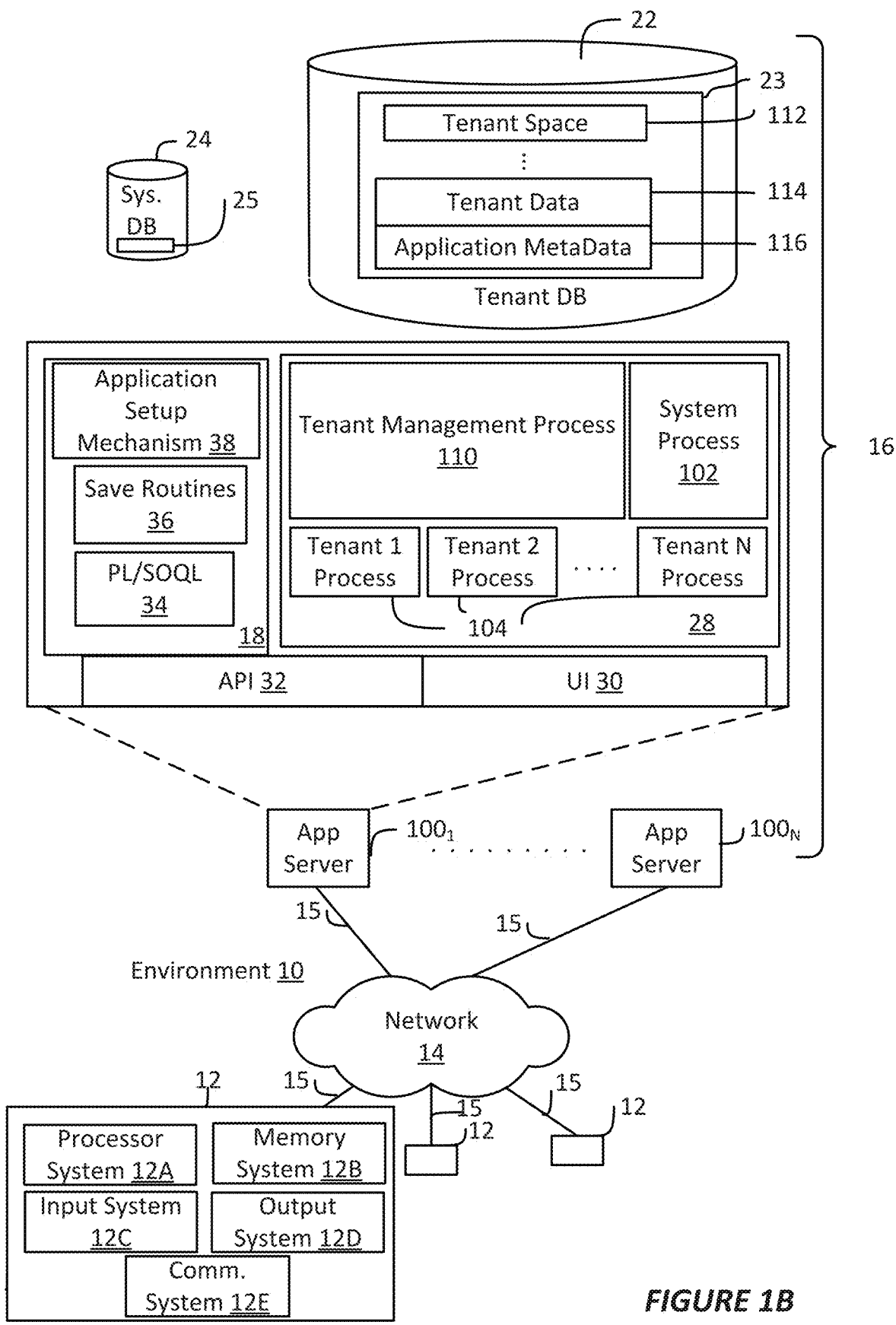
FIG. 1B shows a block diagram of example implementations of elements of FIG. 1A and example interconnections between these elements according to some implementations.

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E.

The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. As examples, the processor system 12A may include Intel® Pentium® or Core™ based processor(s); Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (such as the various application discussed herein) for carrying out the procedures, processes, methods, etc. of the embodiments discussed herein, as well as an operating system (OS) and one or more databases. The OS may manage computer hardware and software resources, and provide common services for the applications via one or more drivers and/or APIs that provide an interface to hardware devices thereby enabling the OS and applications to access hardware functions. The memory system 12B may also include middleware that may connect two or more separate applications or connect applications with underlying hardware components beyond those available from OS and/or the drivers/APIs. The OS may be a general-purpose operating system or an operating system specifically written for and tailored to the user system 12.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," "networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers 100₁-100ₙ. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an API 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server 100₁ can be coupled via the network 14 (for example, the Internet), another application server 100N-1 can be coupled via a direct network link 15, and another application server 100N can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
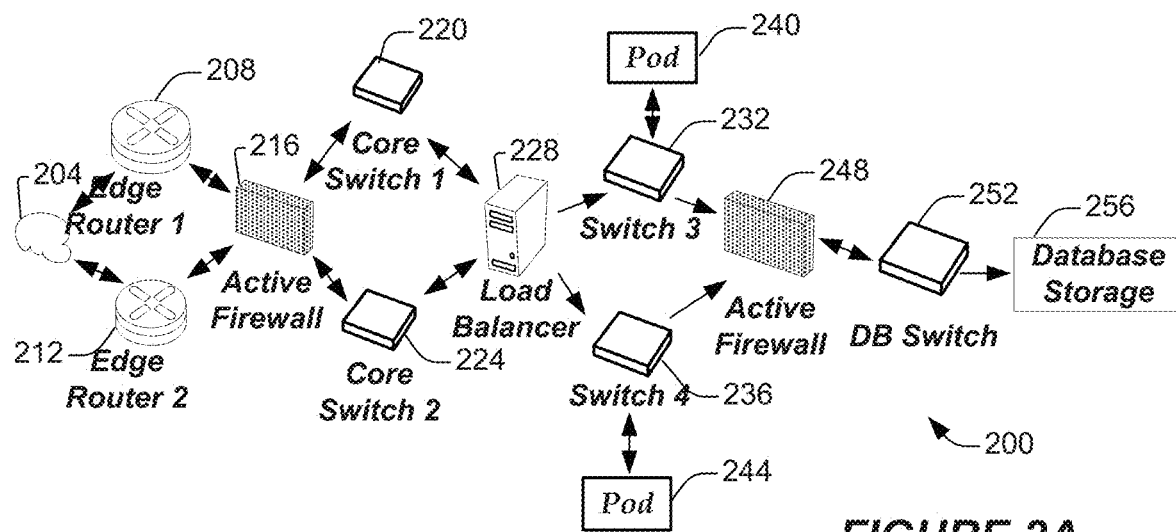
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. In some implementations, the load balancer 228 may be configured to perform the various remediation and/or time-to-live (TTL) forecasting mechanisms, or portions thereof, for pods 236, 244, or the like, as described herein. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
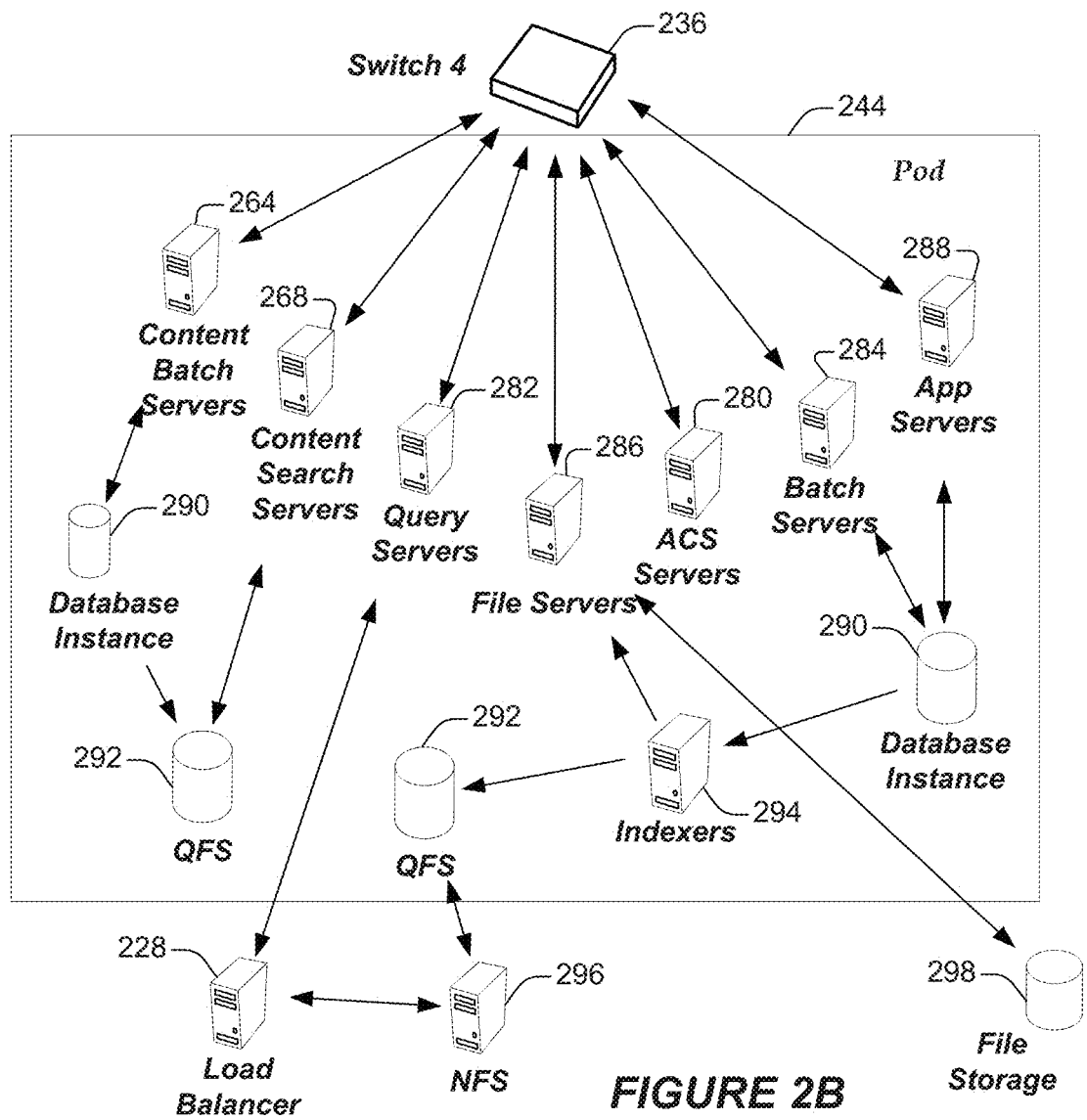
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic. In some implementations, the load balancer 228 may be configured to perform the various remediation and/or time-to-live (TTL) forecasting mechanisms, or portions thereof, for pods 240 and 244 as described herein. In other implementations, one or more app servers 288 within each pod 240, 244 may implement the various remediation and/or time-to-live (TTL) forecasting mechanisms as discussed herein, or portions thereof, for their corresponding pod 240, 244.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B. In some implementations, the database storage 256 may comprise various datastores, such as FFX, HBase™ provided by Apache™, Gridforce provided by Salesforce.com®, BigObjects provided by Salesforce.com®, Software Foundation which runs on top of Apache™ Hadoop®, BigTable provided by Google®, and/or the like.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, the pod 244 may include many more app servers 288 and many more database instances 290 than are shown by FIG. 2B. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed herein.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. As an example, each database instance 290 in the pod 244 may be implemented as a real application cluster (RAC) node. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

Capacity Remediation and TTL Prediction Mechanisms

Figure 3:
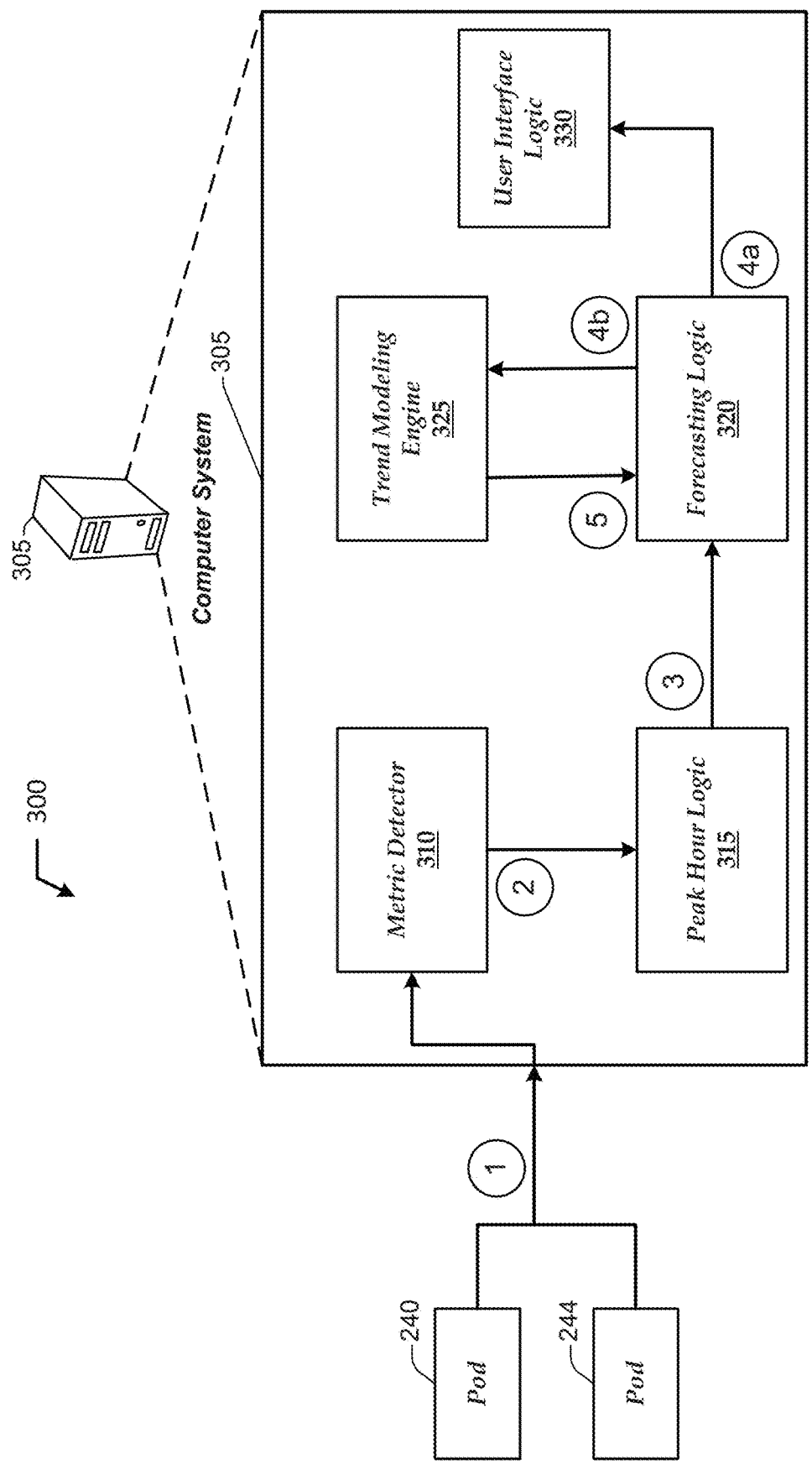
FIG. 3 shows an arrangement in which various embodiments discussed herein may be practiced.

FIG. 3 shows an arrangement 300 in which various embodiments discussed herein may be practiced. In FIG. 3, like numbered items are as described with respect to FIGS. 1A-2B (although not all items shown by FIGS. 1A-2B are shown by FIG. 3). As shown by FIG. 3, arrangement 300 includes pods 240 and 244, and a computer system 305. In various embodiments, the computer system 305 may be implemented (or correspond to) any of the elements/device/systems discussed previously, or may be the same or similar to the previously discussed computer devices/systems. In one example, the computer system 305 may be the load balancer 228, an app server 100/288, or the like. In other embodiments, the computer system 305 (or components thereof) may be distributed across multiple entities/devices/systems. For example, each pod 240/244 may each implement their own individual computer system 305 (or components thereof). In another example, the computer system 305 may be implemented as one or more virtual machines that run on a host system of pod 240, pod 244, app server 100/288, load balancer 228, or some other suitable device. Other arrangements/configurations may be used in other embodiments.

In various embodiments, the computer system 305 may identify a time-to-live (TTL) before pod remediation is to occur and the particular remediations that are needed. As shown, the computer system 305 may include a metric detector 310, peak hour logic 315, trend modeling engine 325, forecasting logic 320, and user interface (UI) logic 330. The entities/elements of computer system 305 may operate as follows.

At node 1, the computer system 305 may obtain various metrics from pods 240 and 244. As alluded to earlier, the pods 244/240 may be nearly identical collections of hardware and software that support a discrete subset of tenant organizations (orgs). A pod may include one or more orgs, however, an org may exist on one pod. An org may only move between pods via pod migration or split. Pods may also be referred to as "instances" from an org perspective, and the name of the instance is a visible part of a URL that an org may use to access their tenant space within the pod. Each pod (including pods 244 and 240) in an environment (e.g., data center) may comprise one or more servers or other computing resources, and each pod may implement several hosts or stacks. Each of these stacks/hosts may have different configurations and workload characteristics/metrics that change over time, and could negatively impact tenant/customer experience. The pod metrics may be obtained by, or fed to the metric detector 310. The metrics provided to the metric detector 310 may be in any suitable format, such as HTML, XML, JSON, and/or some other suitable format and variants thereof, and may be conveyed to the computer system 305 using a Representational State Transfer (REST or RESTful) API, Simple Object Access Protocol (SOAP) API, Apex API, and/or some other like API or mechanism as discussed herein.

In embodiments, the metric detector 310 may monitor and aggregate/compile various pod metrics. In this regard, the metric detector 310 may determine the best or most likely drivers of pod stress or overload for each pod component. The metrics to be measured may include component level metrics, system level metrics, and business level metrics.

The component level metrics may include measurements of hardware resources of a pod, such as database CPU (db_cpu) measurements, database (db) size, storage area network (SAN) input/output (IO) measurements, application CPU (app_cpu) measurements, and the like. The db_cpu metrics may include measurements such as db_cpu utilization or overall db_cpu resource consumption, db time (an elapsed processing time accumulated from elapsed times of non-idle sessions), db_cpu time (e.g., an amount of time that the processor systems of the DB system 16 spend on DB user-level calls (in microseconds)), db_cpu time ratio (e.g., db_cpu time divided by the db time), db_cpu non-idle wait times, db_cpu power usage or consumption, and/or the like. The SAN IO metrics may include measurements such as, an amount of read and/or write operations that can be achieved per unit of time (e.g., IO operations per second (IOPS)), a size of each IO request, based on how much throughput data storage devices can deliver (e.g., average IO size multiplied by IOPS, which may be expressed in megabytes per second (MB/s)), IO response times and/or IO latency times, IO queue sizes. The SAN IO measurements may be taken of physical and/or virtual storage systems. The app_cpu metrics may include measurements such as app_cpu usage or utilization (e.g., for particular app server 100 components), app_cpu idle time, host system memory usage, app_cpu power usage or consumption, and the like.

The system level metrics may include measurements of system accesses, such as average page time (APT), number of transactions, and the like. The business level metrics may include measurements such as a number of incidents; a custom order, metric, values, etc.; a number of active orgs per pod; and/or the like.

In many cases, customer performance may be impacted at different tiers (e.g., application tier, database tier, storage tier, search tier, etc.) in the multi-tier, multi-tenant system in different ways. For example, at an application tier, the metric detector 310 may look at application CPU (app-cpu) utilization and the metric detector 310 may look at db CPU utilization at the db tier. In these cases, as a pod gets stressed at the application tier, the variability of the upper quantiles for app-cpu increases as the median quantile increases. For db CPU utilization, pod stress causes an increase in the median quantile and the increase the upper quantiles to separate from one another. Additionally, db CPU hosts in a pod are typically not well balanced, and the forecasting logic 320 may need to identify unbalanced pods and account for these cases. Therefore, the computer system 305 (e.g., forecasting logic 320) may forecast remediations for the app tier based on app stressing metrics, and forecast remediations for the db tier based on db stressing metrics and load balancing calculations.

The compiling/aggregation of the metrics may be conducted on a periodic basis or based on various trigger events. In some embodiments, the TTL prediction mechanisms may be triggered based on various metrics, or combinations of metrics, reaching a threshold, or the like.

At node 2, the complied/aggregated metrics may be provided to peak hour logic 315. The peak hour logic 315 may analyze the compiled metrics and identify/determine various time based statistics. As used herein, the term "prime hour" or "peak hour" may refer to a window of the busiest hours per region or pod during a predetermined period of time. In some implementations, the time based statistics may be based on a maximum number of transactions per period of time (e.g., 10 million transactions per hour), a maximum average page time (APT) (e.g., 300 milliseconds (ms)), or the like.

At node 3, the compiled/aggregated metrics and/or the peak hour analysis may be provided to the forecasting logic 320, which may use the obtained date to forecast remediation TTLs for the pods 244/240. As an example of aggregation, the peak hour logic 315 may determine an exponentially weighted moving average of hourly (peak hour) of transaction counts for a previous 6 months; an exponentially weighted moving average of hourly (peak hour) APT based on a previous 6 month period; etc. The forecasting logic 320 may use robust forecasting methods to address different metrics, and variability and/or imbalances among the monitored metrics, which may change over time. As discussed previously, the computer system 305 (metric detector 305) may identify metrics that correlate with negative user/customer experience at the different tiers. In embodiments, the forecasting logic 320 may compare the workload characteristics and/or TTLs with historical workload characteristics and TTLs, and feed these predictions back into the system (e.g., to the trend modeling engine 325 at node 4b) to further refine the forecasting mechanisms.

In embodiments, the computer system 305 (metric detector 310) may identify workload characteristics by correlating the monitored metrics of individual tiers with performance service level agreement (SLA) metrics, key performance indicators (KPIs), or some other baseline metrics or thresholds. The workload characteristics may include, for example, output power or power consumption changes for various pods, code regressions due to software releases, deviations (e.g., increases or decreases) in workload from the customer or system perspectives, deviation (e.g., increases or decreases) in customer transaction demands, a number of negative incidents (e.g., failures, overloads, etc.), etc. Based on the workload characteristics, the forecasting logic 320 may identify one or more monitored metrics that drive or otherwise impact pod performance and/or user/customer experience.

The forecasting mechanisms used by the forecasting logic 320 may include regression analysis such as quantile regression, a time-series analysis such as Autoregressive-Moving-Average (ARMA) modeling, Box-cox transformation ARMA residuals Trend and Seasonality (BATS) modeling, Trigonometric BATS (TBATS) modeling, and/or the like. Using such forecasting mechanisms, the forecasting logic 320 may detect anomalies (e.g., detecting slope changes) in the metrics, and adapt the forecast according to those slope changes.

In some embodiments, the forecasting logic 320 may also obtain signals (also referred to as "biasing indicators") that may bias the metric measurements or introduce bias into the forecasting mechanisms. For example, hardware changes, code release dates, code regressions, holidays, etc. may significantly alter the workload characteristics, which can bias TTL forecasts. The biasing indicators may be used to mask certain metrics in order to improve the TTL forecasts.

In embodiments, the forecasting logic 320 may generate a composition TTL by combining the TTLs for each metric of the various tiers to determine capacity remediations for each pod 240/244. This may include predicting a TTL for each metric, and combining the TTL of each metric to obtain a combined or overall TTL. The overall TTL may be used to prioritize remediation procedures for the pods.

The term "remediation" may refer to any type of upgrade or fix to a pod. Example remediations may include hardware upgrades including capacity (e.g., memory) additions, software patches/fixes, hardware refreshes (HWRs), instance refreshes (IRs), load balancing and the like. HWRs may include updating or replacing devices/components of a pod. An IR may involve upgrading the infrastructure supporting tenant/customer instances in various data centers. As a pod remediation, an IR may involve splitting or migrating the pod, and may be considered a "last resort" remediation. "Splitting" a pod may refer to breaking the servers/systems of a pod into two or more pods and distributing the workload among the two or more pods. In some embodiments, the TTLs generated by the forecasting logic 320 may be based on whether a pod will reach an Instance Refresh (IR) date. As discussed previously, an IR is when upgrades to the infrastructure supporting tenant/customer instances in one or more data centers takes place, and the IR date is a date and/or time when an IR is performed. In these embodiments, the severity of a pod may be determined to be a difference between the IR date and a predicted time until a remediation may be needed for the pod.

Figure 5A:
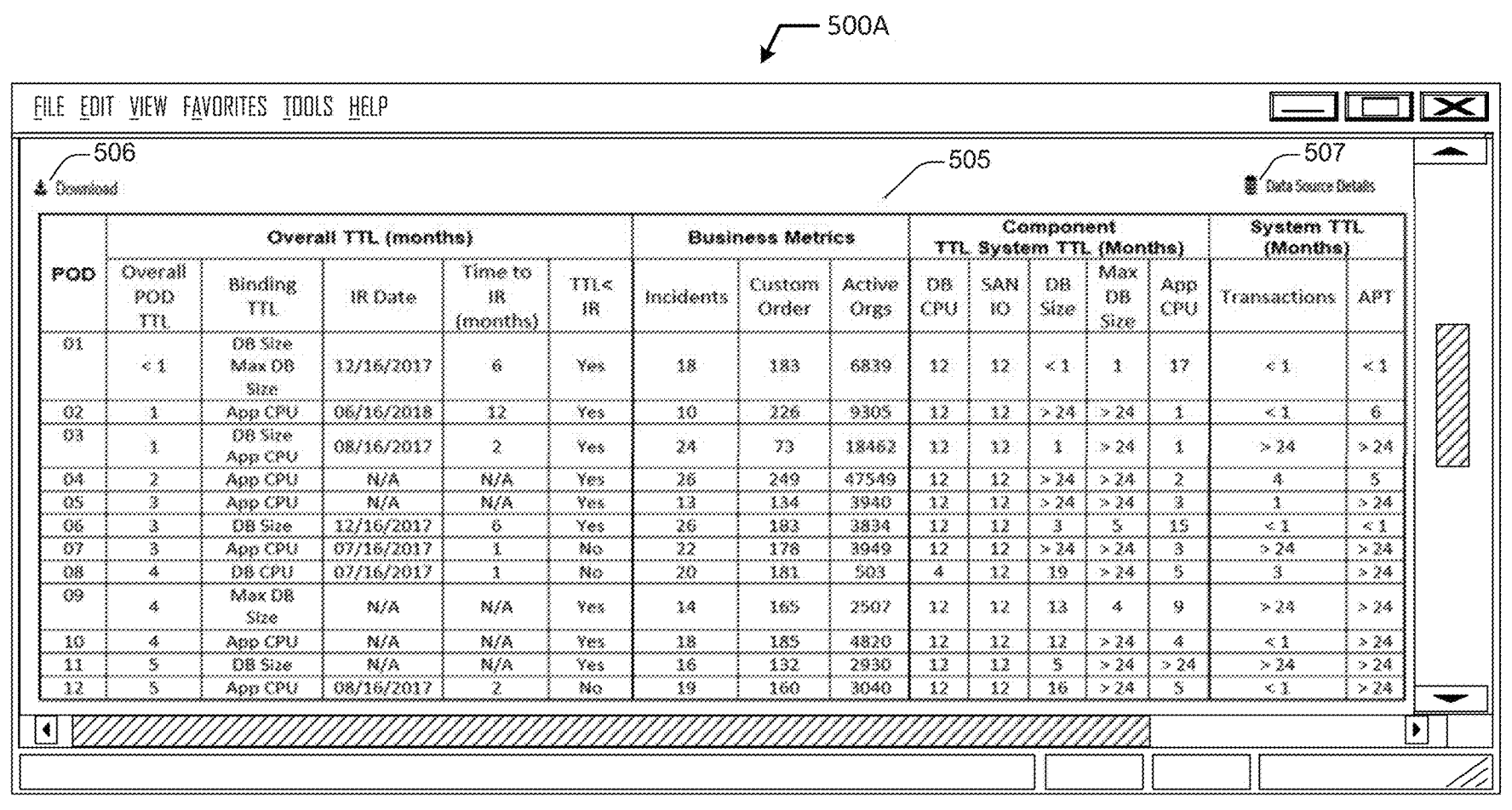
Figure 5B:
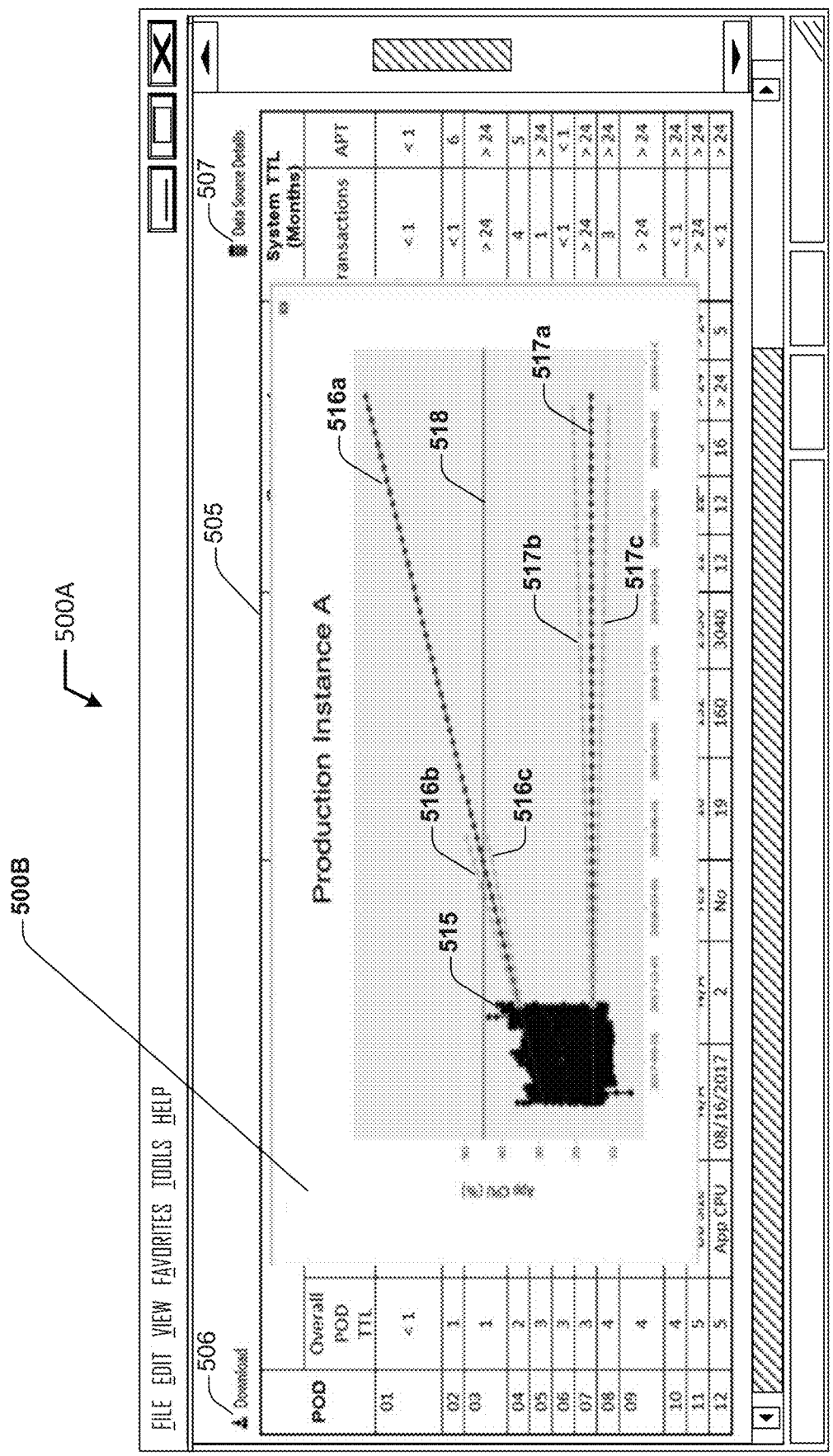

At node 4a, the forecasting logic 320 may provide the forecasting results to UI logic 330, which may generate visual representations or other like UIs to be rendered/displayed by a user system 12. Examples of such UIs are shown by FIGS. 5A, 5B, and 5C.

At node 4b, the forecasting logic 320 may feed the forecasting results back into the system (e.g., to trend modeling engine 325) for further refinement or adjustments in the previously discussed forecasting mechanisms. The trend modeling engine 325 may generate models of overall trends of the metrics and TTLs for the various pods 244/240. In some implementations, the trend modeling engine 325 may use a variety of machine learning (ML) models may be used to generate workload and/or TTL trend models, such as decision trees, several levels of quantile regressions, support vector machines, Bayesian networks, and/or the like and various combinations thereof. Generally, an ML algorithm is a computer program that learns from an experience (e.g., one or more datasets) with respect to some task and some performance measure. An ML model may be any object created after an ML algorithm is trained with one or more training datasets. After training, an ML model may be used to make predictions on new datasets. In embodiments, the forecasting results provided by the forecasting logic 320 may be used as additional training datasets to produce a TTL and/or workload ML model. The TTL/workload ML model may then be used to predict workload characteristics, and/or TTLs. For example, at node 5 the TTL/workload ML model may be provided to the forecasting logic 320 so that the forecasting logic 320 may better predicted workload characteristics and/or TTLs. Performance of nodes 1, 2, 3, 4a and 4b, and 5 may be repeated as necessary.

Figure 4:
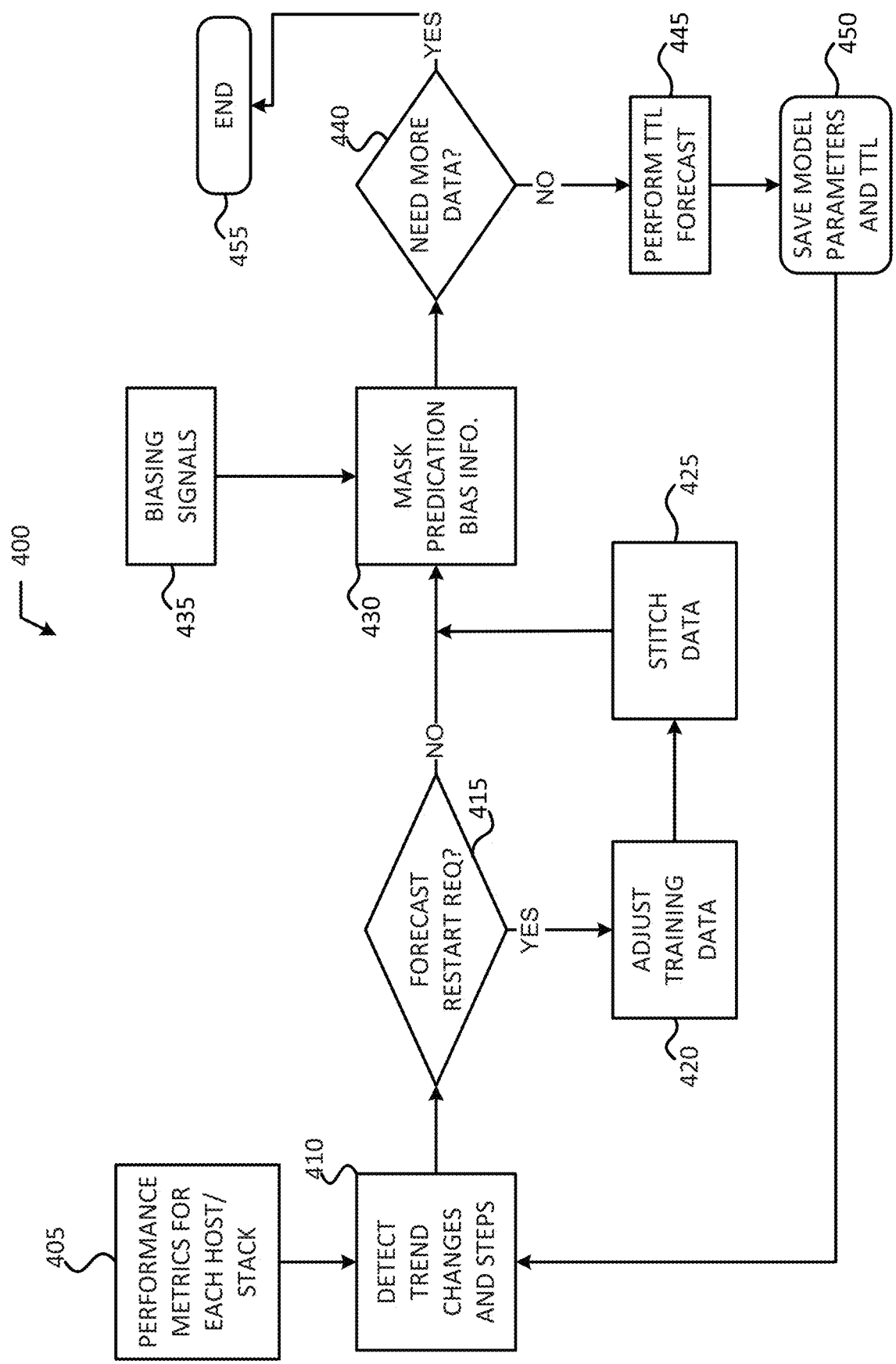
FIG. 4 shows a process for practicing the various embodiments discussed herein.

FIG. 4 illustrates a process 400 for practicing the example embodiments discussed herein. For illustrative purposes, the operations of processes of FIG. 4 is described as being performed by elements/components/devices shown and described with regard to FIG. 3; however, other computing devices may operate the depicted processes in a multitude of implementations, arrangements, and/or environments. In embodiments, the processes may be embodied as program code stored in a memory system, which when executed by a processor system of a computer system, causes the computer system to perform the various operations of such processes. While particular examples and orders of operations are illustrated in FIG. 4, in various embodiments, these operations may be re-ordered, separated into additional operations, combined, or omitted altogether.

Process 400 may be a process for predicting remediation TTLs in accordance with various embodiments discussed herein. Process 400 may begin at operation 402 where the computer system 305 (metric detector 310) collects performance metrics for each host/stack of one or more pods. At operation 410, the computer system 305 (metric detector 310) may detect trend changes and steps. Trend changes are changes in the growth rate of the metric and steps are abrupt changes in the metric. Forecasts adapt accordingly to these trend changes and steps.

At operation 415, the computer system 305 may determine whether a forecast restart has been determined to be necessary. If at operation 415, the computer system 305 determines that a forecast restart is not required, then the computer system 305 may proceed to operation 430 to mask prediction biasing information. If at operation 415, the computer system 305 determines that a forecast restart has been requested, then the computer system 305 may implement the trend modeling engine 420 to adjust the training data, and at operation 425, the computer system 305 may stitch the data. Operation 425 may include combining data sets of measured metrics using, for example, suitable data fusion techniques. The computer system 305 may then proceed to operation 430 to mask prediction biasing information.

At operation 435, the computer system 305 may obtain biasing signals, which may indicate, for example, hardware changes, code release dates, code regressions, holidays, etc. may significantly alter the workload characteristics, and/or any other like indicator that can bias TTL forecasts. At operation 430, the computer system 305 may implement the forecasting logic 320 to mask the biasing signals. At operation 440, the computer system 305 (forecasting logic 320) may determine whether more data is needed to make a TTL forecast. If at operation 440 the computer system 305 determines that more data is needed, then the computer system 305 may proceed to operation 455 to end process 400. If at operation 440 the computer system 305 determines that more data is not needed, then the computer system 305 may proceed to operation 445 to implement the forecasting logic 320 to generate TTL forecasts using a forecasting mechanism. At operation 450, the computer system 305, the computer system 305 may control storage of the model parameters used for making the prediction and the predicted TTL(s), which may then be fed back into the system for detecting trend changes and steps. After performance of operation 450, process 400 may end or repeat as necessary.

FIGS. 5A-5B illustrate example graphical user interfaces (GUIs) 500A and 500B, respectively, in accordance with various embodiments. In particular, GUI 500A of FIG. 5A shows a table of various predicted TTLs for various pods, and GUI 500B of FIG. 5B shows a visual representation of a trend of app-cpu usage for a pod. The example GUIs of FIGS. 5A-5B may be displayed or rendered by a dedicated application implemented by the user system 12 or rendered within a web browser implemented by the user system 12. While particular example GUIs are illustrated, in various embodiments, other interfaces may be utilized. Additionally, while the examples of FIGS. 5A-5B may be generated by program code/modules of the user system 12, in other embodiments, the GUIs may be generated, in whole or in part, by program code/modules at the database system 16 and provided to the user system 12 via the communications system 12E for rendering (e.g., one or more web pages rendered in a browser or application container implemented by the user system 12).

Referring to FIG. 5A, which shows an example TTL forecasting GUI 500A according to some implementations. The GUI 500A may be generated and rendered as a result of requesting the forecasting metrics from the computer system 305, which may be provided by the UI logic 330 as discussed previously. As illustrated, GUI 500A may include a table section 505 showing various metrics for pods 01-12 (each of which may be the same or similar to pods 240/244 discussed previously). The GUI 500 may also include a graphical control elements (GCEs) 506 and 507, where GCE 506 may allow a user to download data shown by table section 505 and GCE 507 may allow the user to view details associated with a data source for the data shown by table section 505. As shown, the measured metrics in table section 505 may include overall TTL metrics, business level metrics, component level metrics, and system level metrics.

The overall TTL metrics may include an overall pod TTL, which may indicate a combined or aggregate TTL for each pod based on some or all of the other metrics in table section 505. In this example, the overall pod TTL is expressed as a number of months. The overall TTL metrics may also include a binding TTL, which may indicate one or more other metrics that are affecting or driving the overall pod TTL. The metrics that drive the binding TTL are determined from a three-dimensional grid of technical stacks (e.g., tiers), sets of metrics, and correlation with performance SLA metrics. The TTLs of the metrics that are dictating impacts on end-user performance experience based on different workload characteristics may be identified as the binding TTLs. For example, the "DB size" and "Max DB size" metrics may be the driving metrics of pod 01, and thus, the overall TTL for pod 01 may be mostly affected by the TTLs of the "DB size" and "Max DB size" metrics. The overall TTL may also include IR date for each pod, a calculated time until the IR (which may be a different between the overall TTL and the IR date), and an indication of whether a pod will make it until the planned IR date ("TTL<IR" in FIG. 5A).

The business level metrics may include TTLs calculated based on business level measurements such as a number of incidents, customer orders, and a number of active orgs per pod. The number of incidents may indicate customer impact possibly due to a number of hardware or system failures or other like occurrences of negative events. The number of active orgs per pod may be the number of tenants whose tenant space resides in the pod. The customer orders may be a custom or proprietary. For example, the customer orders may be an AOV (a number of new and/or renewed tenant subscriptions over a period of time), a percent subscription revenue (total amount spent on customer success divided by total annual subscription revenues), a customer retention cost (CRC) Ratio (total amount spent on customer retention divided by total annual subscription revenues), customer acquisition cost (CAC) ratio (percent of sales and marketing costs spent on acquiring new customers divided by annual revenue), churn rate (number of tenants that did not renew a subscription divided by the number of customers available to renew), expansion rate (incremental revenue from existing customers divided by the total number of subscriptions), and/or other like business metrics.

The component level metrics may include TTLs calculated based on measurements of various hardware resources of a pod, such as db_cpu utilization, db size, SAN IO accesses or utilization, app_cpu utilization, and the like. The system level metrics may include TTLs calculated based on various system measurements, such as an average page time (APT) and a number of transactions.

Referring to FIG. 5B, a production instance GUI 500B may be superimposed or overlaid on top of the GUI 500A shown. In the example of FIG. 5, the production instance GUI 500B shows a "production instance A" for pod 02, which may show a percentage of app_cpu (% app_cpu) usage measured over time. In this example, the upper portion of the measured app_cpu usage 515 may represent app_cpu measurements taken during peak usage periods, while a lower portion of the measured app_cpu usage 515 may represent app_cpu measurements taken during non-peak usage periods or dips in app_cpu usage. The production instance GUI 500B also shows a trend line 516a and a trend line 517a. Trend line 516a may represent a forecasted or predicted peak usage of the % app_cpu based on the various modeling techniques discussed herein, and the trend line 517a may represent a forecasted or predicted non-peak usage of the % app_cpu based on the various modeling techniques discussed herein. Additionally, trend lines 516*a* and 517*a* may each include variance trend lines 516*b*, 516*c* and 517*b*, 517*c*, respectively. The variance trend lines 516*b* and 516*c* may represent a calculated deviation from their respective trend line 516*a*, and trend lines 517*b* and 517*c* may represent a calculated deviation from their respective trend line 517*a*. The variance trend lines may be calculated using known techniques and may be calculated independent of one another.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable storage media (NTCRSM) having instructions stored thereon, wherein execution of the instructions by one or more processors of a computer system is operable to cause the computer system to:
   identify a set of performance metrics of a pod, the pod comprising a set of servers and data storage devices to provide on-demand services for one or more tenants of a database system;
   correlate individual performance metrics of the set of performance metrics with corresponding ones of a set of service-level agreement (SLA) metrics of the pod to generate workload characteristics for the pod;
   determine a pod remediation and a time-to-live (TTL) forecast for the pod based on the workload characteristics, the TTL forecast being an estimated time until the pod remediation is expected to occur; and
   initiate performance of the pod remediation according to the TTL forecast such that the pod remediation is to take place before other pod remediations of other pods with other TTL forecasts that are greater than the TTL forecast.

2. The one or more NTCRSM of claim 1, wherein, to identify the set of performance metrics, execution of the instructions is operable to:
   identify a first set of performance metrics of an application tier of the pod;
   identify a second set of performance metrics of a database (db) tier of the pod;
   identify a third set of performance metrics of a storage tier of the pod; and
   identify a fourth set of performance metrics of a search tier of the pod,
   wherein the first set of performance metrics, second set of performance metrics, third set of performance metrics, and fourth set of performance metrics are different from one another.

3. The one or more NTCRSM of claim 2, wherein:
   the first set of performance metrics comprise application processor system utilization across individual servers of the set of servers;
   the second set of performance metrics comprise a database processor system utilization of a plurality of db servers in relation to one another, a load balance among the set of servers in the pod, and a size of each database in the pod;
   the third set of performance metrics comprise storage area network (SAN) input/output (IO) accesses and/or SAN utilization; and
   the fourth set of performance metrics comprise a number of system accesses, an average page time (APT), and a number of transactions.

4. The one or more NTCRSM of claim 3, wherein, to correlate the set of performance metrics with the corresponding ones of a set of service-level agreement (SLA) metrics, execution of the instructions is operable to:
   identify the workload characteristics for each of the application tier, the db tier, the storage tier, and the search tier.

5. The one or more NTCRSM of claim 2, wherein, to determine the TTL forecast, execution of the instructions is operable to:
   determine an application tier TTL based on the first set of performance metrics;
   determine a database tier TTL based on the second set of performance metrics;

determine a storage tier TTL based on the third set of performance metrics;
determine a search tier TTL based on the fourth set of performance metrics; and
combine the application tier TTL, the database tier TTL, the storage tier TTL, and the search tier TTL to obtain an overall TTL.

6. The one or more NTCRSM of claim 5, wherein, to determine the pod remediation, execution of the instructions is operable to:
determine one or more driver metrics of the first set of performance metrics, the second set of performance metrics, the third set of performance metrics, and/or the fourth set of performance metrics,
the one or more driver metrics being metrics of the first, second, third, or fourth set of performance metrics that impact end-user performance experience greater than other metrics of the first or second set of performance metrics,
wherein the TTL forecast is determined based on a correlation between the one or more driver metrics and the respective SLA metrics.

7. The one or more NTCRSM of claim 1, wherein execution of the instructions is operable to:
negate a biasing effect of biasing indications when the TTL forecast is to be determined, and the biasing indications comprise hardware changes, code release dates, code regressions, and holiday schedules.

8. The one or more NTCRSM of claim 1, wherein execution of the instructions is operable to:
apply one or more machine learning (ML) models to the set of performance metrics to generate workload and/or TTL trend models, the one or more ML models comprising decision trees, several levels of quantile regressions, support vector machines, and/or Bayesian networks.

9. The one or more NTCRSM of claim 1, wherein execution of the instructions is operable to:
feedback the determined TTL forecast to be correlated with a next TTL forecast.

10. A computer system comprising:
an interface system to obtain metrics of a plurality of pods, the pod comprising a set of servers and data storage devices to provide on-demand services for one or more tenants of a database system; and
one or more-processors and a memory, the memory to store instructions that are executable by the one or more processors to:
identify, for each pod of the plurality of pods, a set of performance metrics for each of a plurality of pod components;
correlate individual performance metrics of the set of performance metrics with corresponding ones of a set of service-level agreement (SLA) metrics of each pod to generate workload characteristics for the pod;
determine, for each pod, pod remediations and time-to-live (TTL) forecasts based on the workload characteristics, the TTL forecasts being estimated times until the pod remediation is expected to occur; and
initiate performance of the pod remediations according to the TTL forecasts such that an individual pod remediation of a pod is to take place before other pod remediations of other pods with other TTL forecasts that are greater than the TTL forecast of the individual pod.

11. The computer system of claim 10, wherein, to identify the set of performance metrics, the instructions are further executable by the one or more processors to:
identify a first set of performance metrics of an application tier of the pod;
identify a second set of performance metrics of a database (db) tier of the pod;
identify a third set of performance metrics of a storage tier of the pod; and
identify a fourth set of performance metrics of a search tier of the pod, and
the first set of performance metrics, the second set of performance metrics, the third set of performance metrics, and the fourth set of performance metrics are different from one another.

12. The computer system of claim 11, wherein:
the first set of performance metrics comprise application processor system utilization across the set of servers;
the second set of performance metrics comprise a database processor system utilization of a plurality of db servers in relation to one another, a load balance among the set of servers in the pod, and a size of each database in the pod;
the third set of performance metrics comprise storage area network (SAN) input/output (IO) accesses and/or SAN utilization; and
the fourth set of performance metrics comprise a number of system accesses, an average page time (APT), and a number of transactions.

13. The computer system of claim 12, wherein, to correlate the set of performance metrics with the corresponding ones of the set of SLA metrics, the one or more processors are to:
identify the workload characteristics for each of the application tier, the db tier, the storage tier, and the search tier.

14. The computer system of claim 11, wherein, to determine the TTL forecast, the one or more processors to:
determine an application tier TTL based on the first set of performance metrics;
determine a database tier TTL based on the second set of performance metrics;
determine a storage tier TTL based on the third set of performance metrics;
determine a search tier TTL based on the fourth set of performance metrics; and
combine the application tier TTL, the database tier TTL, the storage tier TTL, and the search tier TTL to obtain an overall TTL.

15. The computer system of claim 14, wherein, to determine the pod remediation, the one or more processors are to:
determine one or more driver metrics of the first set of performance metrics, the second set of performance metrics, the third set of performance metrics, and/or the fourth set of performance metrics,
the one or more driver metrics being metrics of the first, second, third, or fourth set of performance metrics that impact end-user performance experience greater than other metrics of the first or second set of performance metrics,
wherein the TTL forecast is determined based on a correlation between the one or more driver metrics and the respective SLA metrics.

16. The computer system of claim 10, wherein the one or more processor systems are to:
negate a biasing effect of biasing indications when the TTL forecast is to be determined, and the biasing indications comprising hardware changes, code release dates, code regressions, and holiday schedules.

17. The computer system of claim 10, wherein the one or more processors are to:
apply one or more machine learning (ML) models to the set of performance metrics to generate workload and/or TTL trend models, the one or more ML models comprising decision trees, several levels of quantile regressions, support vector machines, and/or Bayesian networks.

18. The computer system of claim 10, wherein the one or more processors are to:
feedback the determined TTL forecast to be correlated with a next TTL forecast.

19. The computer system of claim 10, wherein individual pods of the plurality of pods comprise one or more content batch servers, one or more content search servers, one or more query servers, one or more file force servers, one or more access control system (ACS) servers, one or more batch servers, one or more application servers, one or more database instances implemented by one or more data storage systems, one or more quick file systems (QFS), and one or more indexer servers.

20. The computer system of claim 19, wherein the computer system is implemented by a load balancer outside of each pod of the plurality of pods or an application server within a pod of the plurality of pods.

\* \* \* \* \*